(12) United States Patent
Freijy

(10) Patent No.: US 6,767,040 B1
(45) Date of Patent: Jul. 27, 2004

(54) INDEPENDENT BACK SLIDE AND STOW

(75) Inventor: Nizar Freijy, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/250,027

(22) Filed: May 29, 2003

(51) Int. Cl.⁷ .................................. B60N 2/22
(52) U.S. Cl. ......................... 296/65.09; 296/65.13; 296/65.16; 297/383
(58) Field of Search .................. 296/63, 65.01, 296/65.09, 65.13, 65.16; 297/383

(56) References Cited

U.S. PATENT DOCUMENTS

| | | | |
|---|---|---|---|
| 4,712,824 A | * 12/1987 | Naert | 296/65.01 |
| 5,702,145 A | * 12/1997 | Fowler et al. | 296/66 |
| 6,183,033 B1 | * 2/2001 | Arai et al. | 296/65.09 |
| 6,193,317 B1 | * 2/2001 | Mitschelen et al. | 297/378.1 |
| 6,455,948 B1 | * 9/2002 | Berger | 307/10.1 |
| 6,568,756 B2 | * 5/2003 | Sugimoto et al. | 297/335 |
| 6,592,926 B2 | * 7/2003 | Ong et al. | 426/575 |
| 6,666,512 B1 | * 12/2003 | Timon | 297/335 |

* cited by examiner

Primary Examiner—D. Glenn Dayoan
Assistant Examiner—Greg Blankenship
(74) Attorney, Agent, or Firm—Bill C Panagos

(57) ABSTRACT

The present invention discloses a folding seat assembly for a vehicle having a floor, comprising a seat cushion mounted to said vehicle floor and a seat back independent of said seat cushion and pivotally mounted on tracks to allowing said seat back to be moved away from said seat cushion and folded forward into a substantially horizontal position producing a cargo area over said folded seat. The folding seat assembly being mountable in a vehicle without modification to the vehicle floor pan or the need for special mounting brackets to provide a seat storage area.

19 Claims, 4 Drawing Sheets

INDEPENDENT BACK SLIDE AND STOW

BACKGROUND OF INVENTION

1. Field of the Invention

The present invention generally relates to an automobile seat and, more specifically, to an improved automobile seat having the capability of being set into a horizontal position to form a low luggage compartment floor without the need for special a floor pan or special brackets to receive the horizontally positioned seat components. And in addition provides for a cargo floor surface which extends over and covers, both the seat back and the seat cushion.

2. Description of the Related Art

Provision for having a third row of seats in utility, sport vehicles as well as in vans is common practice. The desire to make this third row of seats removable or capable of folding to allow the space occupied by the third row seats to be used as cargo space is also known.

For example, U.S. Pat. No. 5,658,046 issued Aug. 19, 1997 to Rus teaches a two part seat wherein the seat cushion portion of the seat folds forward into a vertical position and the seat back portion then folds forward into a horizontal position and provides a molding piece to cover the gap between the rear edge of the horizontally positioned seat back and the front edge of the floor pan rear cargo area.

U.S. Pat. No. 5,800,015 issued Sep. 1, 1998 to Tsuchiya et al teaches a slide rail device to allow a seat to be moved forward against the seat back of the front seat after the rear seat cushion is raised to a vertical position against the rear seat back.

U.S. Pat. No. 5,934,732 issued Aug. 10, 1999 to Jakubiec teaches a two part seat which has the seat back portion locked into an upright position by the seat cushion portion without the need for release pins or knobs. The seat cushion portion being moveable to a forward horizontal storage position after which the seat back portion may be folded forward to a horizontal position to allow for cargo storage.

U.S. Pat. No. 6,371,556 issued Apr. 16, 2002 to Arai teaches a seat which can be folded into a horizontal storage position utilizing a mounting bracket system which provided for horizontal storage space for the seat back.

U.S. patent application Ser. No. 2001/0050502 published Dec. 13, 2001 to Fourrey et al teaches a foldable seat design which allows the seat to be folded into a horizontal storage position in the foot area of the passenger compartment or folded into a horizontal position allowing an occupant to lie in a reclined position.

U.S. patent application Ser. No. 2002/0033623 published Mar. 21, 2002 to Sunohara teaches a folding seat having a two part seat cushion portion the forward portion folding into the foot well area and the seat back portion then folding forward and downward into a horizontal position on top of the rear seat cushion portion to provide a cargo area.

U.S. patent application Ser. No. 2002/0033624 published Mar. 21, 2002 to Konishi et al teaches a locking mechanism for locking a folding seat back in the down or horizontal position.

However, it is desirable to have a third row seat system that does not require removal to allow use of the space for cargo. It is further desirable to have a seat system that does not require retooling of the vehicles floor pan or the addition of special seat storage fittings.

DISCLOSURE OF THE INVENTION

The present invention provides advantages and alternatives over the prior art by providing a folding seat assembly for a vehicle having a floor, comprising a seat cushion mounted to said vehicle floor and a seat back independent of said seat cushion and pivotally mounted on tracks to allowing said seat back to be moved away from said seat cushion and folded forward into a substantially horizontal position producing a cargo area over said folded seat. The folding seat assembly being mountable in a vehicle without modification to the vehicle floor pan or the need for special mounting brackets to provide a seat storage area.

According to a further aspect of the present invention, a folding seat assembly for a vehicle having a floor, comprising: a seat cushion mounted to said vehicle floor; a pair of parallel spaced apart tracks wherein one of said pair of parallel spaced apart tracks is located on each side of said seat cushion; a seat back latch engaged in each of said spaced apart tracks; a seat back pivotally mounted to said seat back latches and not attached to said seat cushion; and a means for engaging and disengaging said seat back latches with said pair of parallel spaced apart tracks allowing the seat back to be moved along said pair of parallel spaced apart tracks and locked into a desired position; thereby allowing said seat back to be moved away from said seat cushion and pivotally folded forward into a substantially horizontal position producing a cargo area over said folding seat assembly.

According to yet another aspect of the present invention a folding seat assembly for a vehicle having a floor, comprising: a seat cushion mounted to said vehicle floor; a air of parallel spaced apart tracks wherein one of said pair of parallel spaced apart tracks is located on each side of said seat cushion; a seat back latch engaged in each of said spaced apart tracks; a seat back pivotally mounted to said seat back latches and not attached to said seat cushion; a means for engaging and disengaging said seat back latches with said pair of parallel spaced apart tracks allowing the seat back to be moved along said pair of parallel spaced apart tracks and locked into a desired position; and a filler panel positionable over said seat cushion and said seat back; thereby allowing said seat back to be moved away from said seat cushion, pivotally folded forward into a substantially horizontal position, and said filler panel positioned over the folded seat assembly producing a cargo area over said folding seat assembly.

The present invention thus advantageously provides a vehicle seating area which may be utilized as a cargo area by folding the seat assembly to a substantially horizontal position without the need for vehicle floor pan modifications or special storage area mounting brackets.

DETAILED DESCRIPTION

Figure 1:
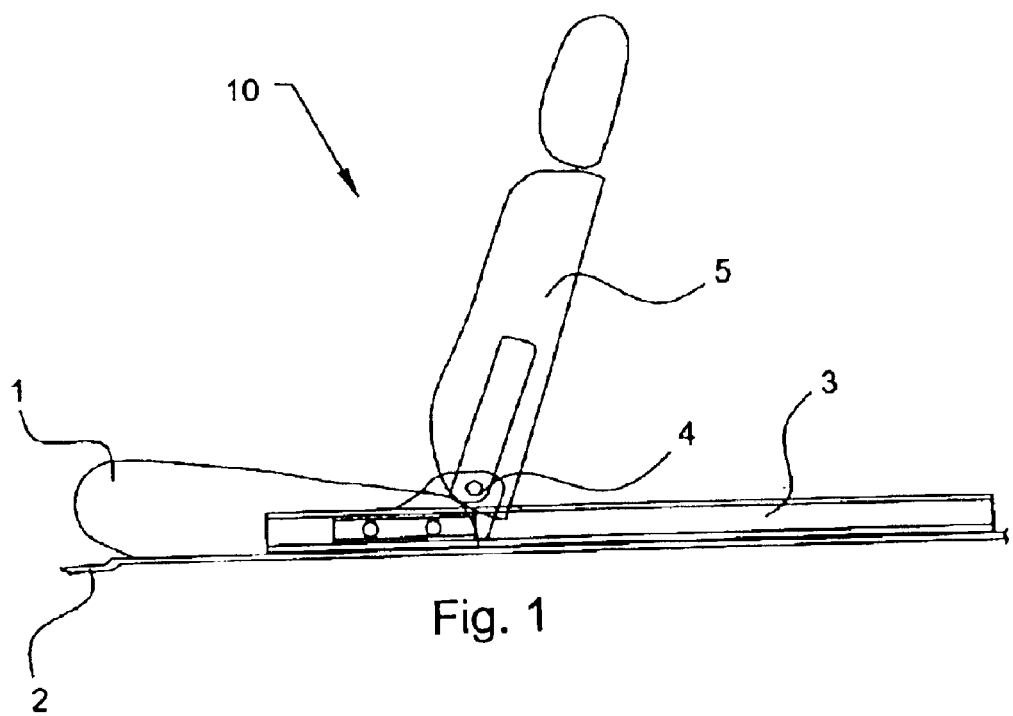
FIG. 1 shows a plan side view of the seat of the present invention in the normal occupant seating position.

Reference will now be made to the drawings, wherein to the extent possible like reference numerals are utilized to designate like components throughout the various views. Referring to FIG. 1, which presents a storable seat of the present invention 10 having a seat cushion 1 permanently mounted to a vehicle floor pan 2, and a pair of parallel spaced apart tracks 3 positioned on either side of seat cushion 1, a seat back latch 4 mounted in each of said parallel tracks 3, and a seat back mounted to said seat back latches 4 and not connected to seat cushion 1.

Figure 2:
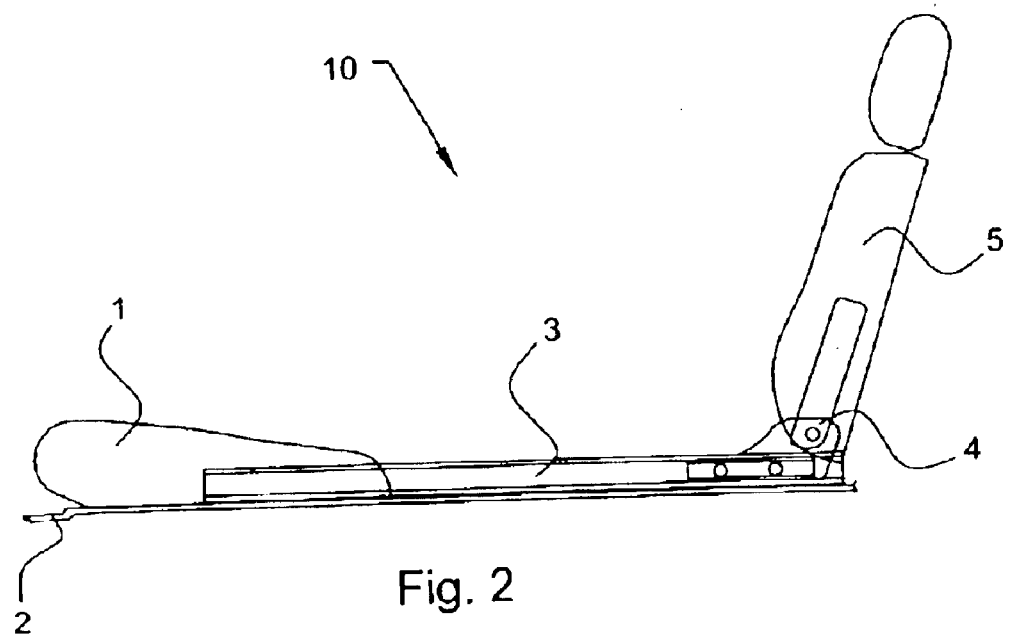
FIG. 2 shows a plan side view of the seat of the present invention with the seat back moved rearward in preparation for folding the seat down.
Figure 3:
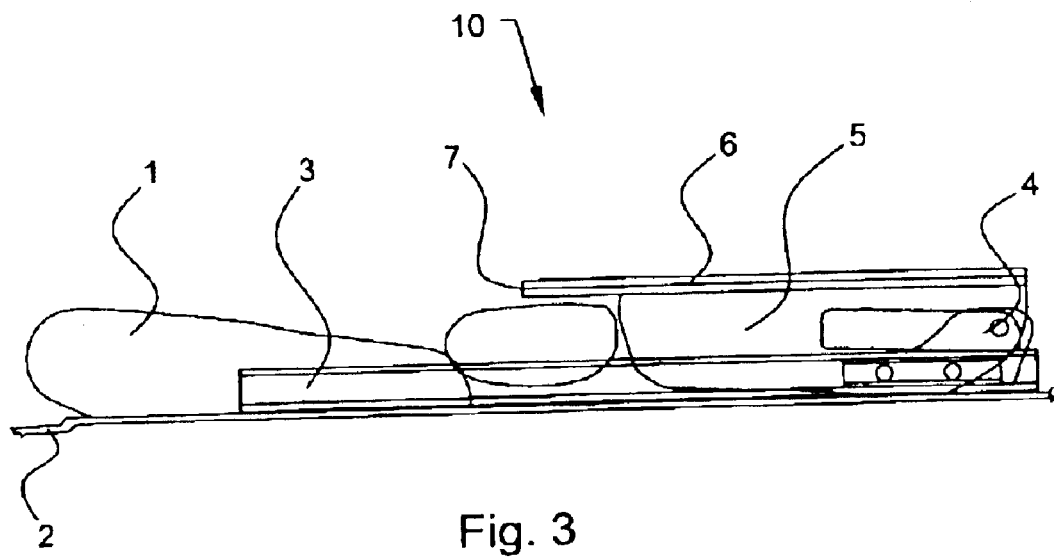
FIG. 3 shows a plan side view of the seat of the present invention with the seat back folded down in a storage position and a hinged filler panel positioned over the folded seat.

Referring now to FIG. 2, there is shown a storable seat 10 with the seat back 5 moved to a rearward position through movement of seat back latches 4 rearward along parallel spaced apart tracks 3 to provide sufficient distance between the rear edge of the seat cushion 1 and the top edge of seat back 5 when lowered to a horizontal storage position (FIG. 3). The movement of the seat back 2 may be accomplished by either a manual function or a power function as are well known in the art.

Turning now to FIG. 3 there is shown the storable seat 10 of the present invention in a down or storage position. Seat cushion 1 remains in its permanent position mounted directly to floor pan 2, seat back 5 is lowered forward into a horizontal position by pivoting on seat back latches 4 mounted on parallel spaced apart tracks 3, and a hinged 7 multi-section filler panel 6 is positioned over the storage positioned seat back 5.

Figure 4:
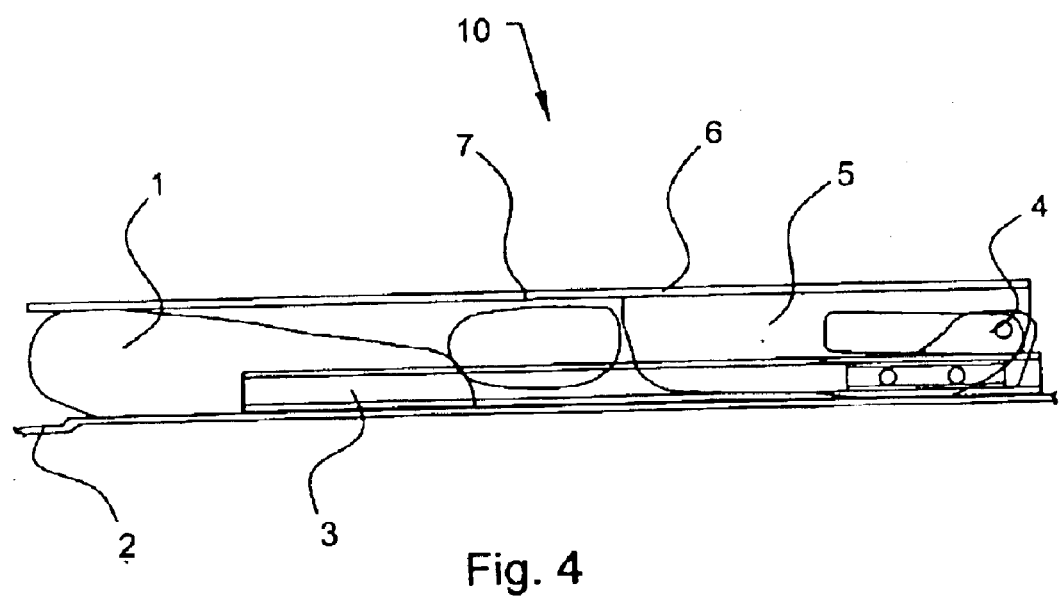
FIG. 4 show a plan side view of the seat of the present invention folded into the storage position and the filler panel unfolded and covering the seat and providing a cargo storage flooring area.

Turning to FIG. 4 there is shown the storable seat 10 of the present invention in a down or storage position. Seat cushion 1 remains in its permanent position mounted directly to floor pan 2, seat back 5 is lowered forward into a horizontal position by pivoting on seat back latches 4 mounted on parallel spaced apart tracks 3, and a hinged 7 multi-section filler panel 6 is unfolded over the storage positioned seat back 5 and seat cushion 1, thereby creating a cargo area while protecting the seat from damage from loaded cargo.

Figure 5:
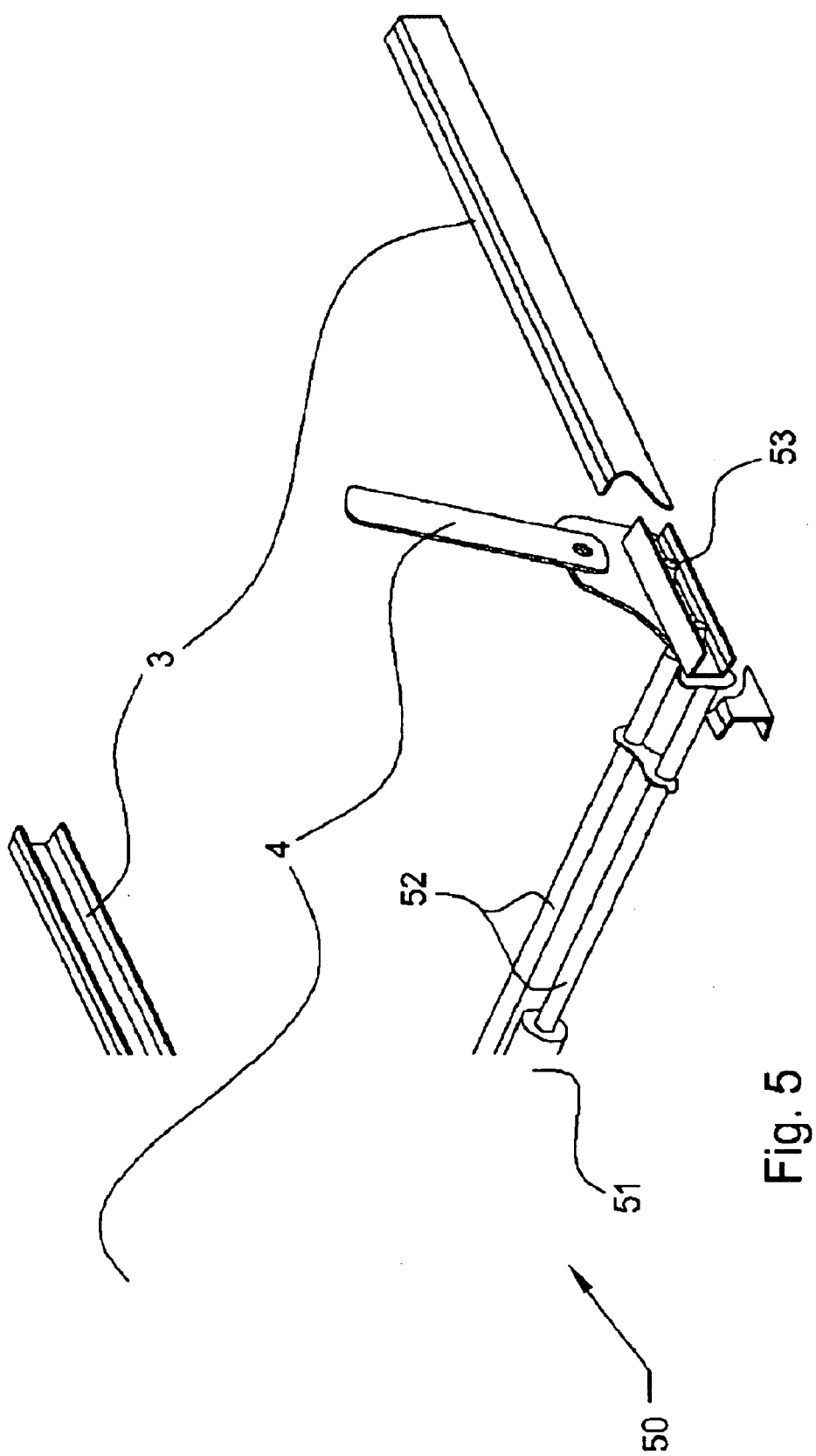
FIG. 5 shows a perspective view of a motorized system to move the seat back suitable for use in the present invention.

There is shown in FIG. 5 a seat back movement power system 50 for moving the seat back 5 (not shown), mounted on back latches 4 along the pair of parallel spaced apart tracks 3 using a motor 51 which turns flexible shafts 52 and internal screw drives 53 mounted on back latches 4 and thereby moving back latches 4 along parallel spaced apart tracks 3.

Figure 6:
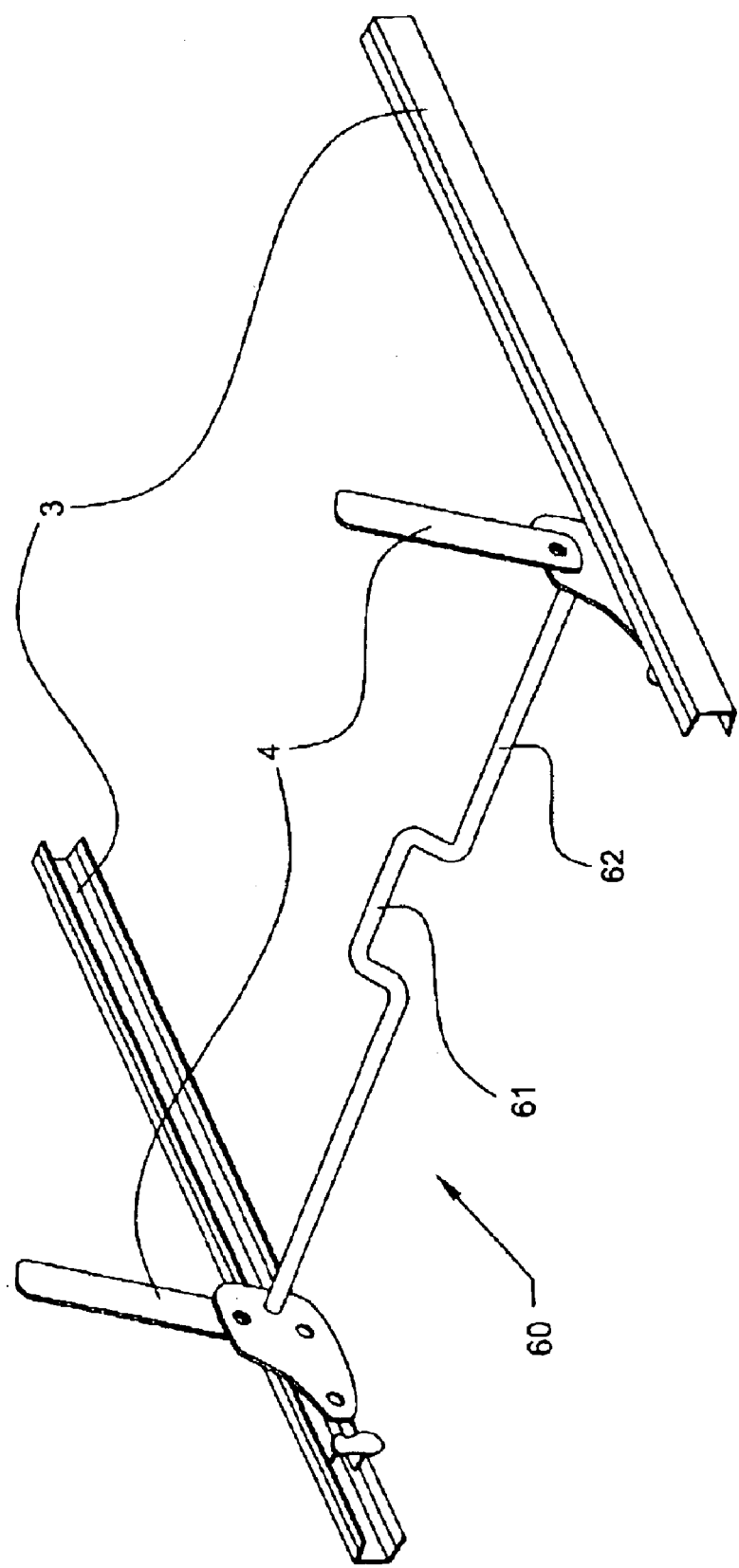
FIG. 6 shows a perspective view of a manual system to move the seat back suitable for use in the present invention.

There is shown in FIG. 6 a manual seat back movement system 60 for moving seat back 5 (not shown), mounted on back latches 4 along a pair of parallel spaced apart tracks 3 using a towel bar release 62 preferably having a handle portion 61 to release back latches 4 from locking engagement with parallel spaced apart tracks 3 thereby allowing the movement of seat back 5 (not shown).

In the present invention the seat cushion 1 is permanently mounted to the vehicle floor pan 2 and does not require movement or removal to affect the use of the space taken up by the seat cushion 1 as cargo space. Presently preferred is a seat cushion 1 constructed of suitable foam over a wire frame with a suitable fabric covering. Likewise the seat back 5 may be constructed of any well known seating construction. And likewise it does not require the removal of the seat back from the vehicle to allow the seating area to be utilized as cargo space.

The seat tracks 3 are preferably mounted in a vertical position to help prevent foreign objects from interfering with the function of the tracks. In the preferred manual seat back movement system the seat back 5 has an indentation for storage of the towel bar release 61 handle 62 to provide for a more unobstructed cargo area behind the seat back 5 when seat back 5 is in an upright position. The tracks 3, seat back latches 4, manual 60 and motorized 50 track movement systems are well known in the art and need no further discussion here.

One particularly preferred embodiment of the present invention provides for a folding seat assembly for a vehicle having a floor, comprising: a seat cushion mounted to said vehicle floor; a pair of parallel spaced apart tracks wherein one of said pair of parallel spaced apart tracks is located on each side of said seat cushion; a seat back latch engaged in each of said spaced apart tracks; a seat back pivotally mounted to said seat back latches and not attached to said seat cushion; a means for engaging and disengaging said seat back latches with said pair of parallel spaced apart tracks allowing the seat back to be moved along said pair of parallel spaced apart tracks and locked into a desired position; and a filler panel positionable over said seat cushion and said seat back; thereby allowing said seat back to be moved away from said seat cushion, pivotally folded forward into a substantially horizontal position, and said filler panel positioned over the folded seat assembly producing a cargo area over said folding seat assembly.

Although the preferred embodiments of the present invention has been disclosed, various changes and modifications may be made without departing from the scope of the invention as set forth in the appended claims.

What is claimed is:

1. A folding seat assembly for a vehicle having a floor, comprising:

a seat cushion mounted to said vehicle floor;

a pair of parallel spaced apart tracks wherein one of said pair of parallel spaced apart tracks is located on each side of said seat cushion;

a seat back latch engaged in each of said spaced apart tracks;

a seat back pivotally mounted to said seat back latches and not attached to said seat cushion; and a means for engaging and disengaging said seat back latches with said pair of parallel spaced apart tracks allowing the seat back to be moved along said pair of parallel spaced apart tracks and locked into a desired position;

thereby allowing said seat back to be moved away from said seat cushion and pivotally folded forward into a substantially horizontal position producing a cargo area over said folding seat assembly.

2. The folding seat assembly as claimed in claim 1 wherein, said seat cushion is permanently mounted to the vehicle floor.

3. The folding seat assembly as claimed in claim 1 wherein, said seat cushion comprises foam around a wire support frame.

4. The folding seat assembly as claimed in claim 1 wherein, said means for engaging and disengaging said seat back latches is a manual means.

5. The folding seat assembly as claimed in claim 1 wherein, said means for engaging and disengaging said seat back latches is an electrically operated means.

6. The folding seat assembly as claimed in claim 1 wherein, said parallel spaced apart tracks are mounted in a vertical position.

7. The folding seat assembly as claimed in claim 1 wherein, said means for engaging and disengaging said seat back latches is an electric motor operably connected to an internal screw drive mounted in each parallel spaced apart track.

8. The folding seat assembly as claimed in claim 1 wherein, said means for engaging and disengaging said seat back latches is a manual means comprising an internal screw drive mounted in each parallel spaced apart track and operably connected to a handle bar.

9. A folding seat assembly for a vehicle having a floor, comprising:

a seat cushion mounted to said vehicle floor;

a pair of parallel spaced apart tracks wherein one of said pair of parallel spaced apart tracks is located on each side of said seat cushion;

a seat back latch engaged in each of said spaced apart tracks;

a seat back pivotally mounted to said seat back latches and not attached to said seat cushion;

a means for engaging and disengaging said seal back latches with said pair of parallel spaced apart tracks allowing the seat back to be moved along said pair of parallel spaced apart tracks and locked into a desired position; and a filler panel positionable over said seat cushion and said seat back;

thereby allowing said seat back to be moved away from said seat cushion, pivotally folded forward into a substantially horizontal position, and said filler panel positioned over the folded seat assembly producing a cargo area over said folding seat assembly.

10. The folding seat assembly as claimed in claim 9 wherein, said seat cushion is permanently mounted to the vehicle floor.

11. The folding seat assembly as claimed in claim 9 wherein, said seat cushion comprises foam around a wire support frame.

12. The folding seat assembly as claimed in claim 9 wherein, said means for engaging and disengaging said seat back latches is a manual means.

13. The folding seat assembly as claimed in claim 9 wherein, said means for engaging and disengaging said seat back latches is an electrically operated means.

14. The folding seat assembly as claimed in claim 9 wherein, said filler panel is not attached to said vehicle folding seat assembly.

15. The folding seat assembly as claimed in claim 9 wherein, said filler panel is attached to said vehicle folding seat assembly.

16. The folding seat assembly as claimed in claim 9 wherein, said filler panel comprises a multiple section hinged filler panel.

17. The folding seat assembly as claimed in claim 9 wherein, said parallel spaced apart tracks are mounted in a vertical position.

18. The folding seat assembly as claimed in claim 9 wherein, said means for engaging and disengaging said seat back latches is an electric motor operably connected to an internal screw drive mounted in each parallel spaced apart track.

19. The folding seat assembly as claimed in claim 9 wherein, said means for engaging and disengaging said seat back latches is a manual means comprising an internal screw drive mounted in each parallel spaced apart track and operably connected to a handle bar.

* * * * *